United States Patent
Clark et al.

(10) Patent No.: US 8,768,750 B2
(45) Date of Patent: Jul. 1, 2014

(54) SYSTEM AND METHOD FOR ALIGNING PROJECTS WITH OBJECTIVES OF AN ORGANIZATION

(75) Inventors: Terrence G. Clark, Smithtown, NY (US); Peter J. Gilbert, New York, NY (US); Fernando Nogueras Alvarez, Bonn (DE)

(73) Assignee: CA, Inc., Islandia, NY (US)

( * ) Notice: Subject to any disclaimer, the term of this patent is extended or adjusted under 35 U.S.C. 154(b) by 317 days.

(21) Appl. No.: 12/765,931

(22) Filed: Apr. 23, 2010

(65) Prior Publication Data

US 2011/0060613 A1    Mar. 10, 2011

Related U.S. Application Data

(60) Provisional application No. 61/240,968, filed on Sep. 9, 2009.

(51) Int. Cl.
G06Q 10/00 (2012.01)
G06Q 10/06 (2012.01)

(52) U.S. Cl.
CPC .................... *G06Q 10/0639* (2013.01)
USPC .......................... 705/7.39; 717/106

(58) Field of Classification Search
None
See application file for complete search history.

(56) References Cited

U.S. PATENT DOCUMENTS

| | | | |
|---|---|---|---|
| 6,332,434 B1 * | 12/2001 | De Souza et al. | 123/3 |
| 6,701,298 B1 | 3/2004 | Jutsen | |
| 6,856,907 B2 | 2/2005 | Rosenblum et al. | |
| 7,117,161 B2 * | 10/2006 | Bruce | 705/7.26 |
| 7,640,225 B2 * | 12/2009 | Clater | 706/50 |
| 8,200,527 B1 * | 6/2012 | Thompson et al. | 705/7.39 |
| 8,204,809 B1 * | 6/2012 | Wise | 705/35 |
| 2003/0083912 A1 * | 5/2003 | Covington et al. | 705/7 |
| 2003/0110067 A1 * | 6/2003 | Miller et al. | 705/8 |
| 2003/0158800 A1 * | 8/2003 | Pisello et al. | 705/35 |
| 2004/0001103 A1 * | 1/2004 | Fliess et al. | 345/810 |
| 2004/0068431 A1 * | 4/2004 | Smith et al. | 705/10 |
| 2004/0073443 A1 * | 4/2004 | Gabrick et al. | 705/1 |
| 2005/0114829 A1 | 5/2005 | Robin et al. | |
| 2005/0197873 A1 | 9/2005 | Little | |
| 2005/0209905 A2 | 9/2005 | Ness et al. | |

(Continued)

OTHER PUBLICATIONS

Prasad, R.. (2007). Schedule and Cost Risk Evaluation. AACE International Transactions,RI41-RI45.*

(Continued)

*Primary Examiner* — Gurkanwaljit Singh
(74) *Attorney, Agent, or Firm* — Baker Botts, LLP

(57) ABSTRACT

According to one embodiment, a computer-implemented method for aligning projects with an objective of an organization is disclosed. The method may include storing in a computer system a representation of an objective of an organization. The method may further include storing in the computer system a plurality of sustainability projects of the organization. Additionally, the method may include establishing a computer-based logical link between the objective of the organization and at least some of the plurality of sustainability projects of the organization. In certain embodiments, the method may include receiving from the computer system data representing one or more respective metrics for each of the at least some of the plurality of sustainability projects of the organization. The method may further include generating one or more key performance indicators for each of the at least some of the plurality of sustainability projects of the organization. Each key performance indicator may indicate a contribution of a particular sustainability project of the organization towards achieving the objective of the organization.

21 Claims, 8 Drawing Sheets

(56) References Cited

U.S. PATENT DOCUMENTS

| | | | |
|---|---|---|---|
| 2005/0228730 A1* | 10/2005 | Henderson | 705/35 |
| 2006/0010164 A1* | 1/2006 | Netz et al. | 707/104.1 |
| 2006/0026053 A1* | 2/2006 | Dezonno et al. | 705/9 |
| 2006/0095915 A1* | 5/2006 | Clater | 718/100 |
| 2006/0112104 A1* | 5/2006 | An et al. | 707/10 |
| 2006/0235778 A1* | 10/2006 | Razvi et al. | 705/35 |
| 2006/0277156 A1* | 12/2006 | Merican | 707/2 |
| 2007/0021967 A1* | 1/2007 | Jaligama et al. | 705/1 |
| 2007/0038494 A1 | 2/2007 | Kreitzberg et al. | |
| 2007/0174161 A1 | 7/2007 | Bullock et al. | |
| 2007/0180490 A1* | 8/2007 | Renzi et al. | 726/1 |
| 2007/0198284 A1* | 8/2007 | Korenblit et al. | 705/1 |
| 2007/0198322 A1* | 8/2007 | Bourne et al. | 705/10 |
| 2007/0250377 A1* | 10/2007 | Hill et al. | 705/11 |
| 2007/0255457 A1 | 11/2007 | Whitcomb et al. | |
| 2007/0260405 A1 | 11/2007 | McConnell et al. | |
| 2008/0120129 A1* | 5/2008 | Seubert et al. | 705/1 |
| 2008/0163164 A1* | 7/2008 | Chowdhary et al. | 717/106 |
| 2008/0201159 A1* | 8/2008 | Gabrick et al. | 705/1 |
| 2008/0228516 A1 | 9/2008 | Gotthelf et al. | |
| 2008/0255899 A1 | 10/2008 | McConnell et al. | |
| 2008/0281615 A1 | 11/2008 | Musier et al. | |
| 2009/0018884 A1 | 1/2009 | McConnell et al. | |
| 2009/0037238 A1* | 2/2009 | Macgregor | 705/7 |
| 2009/0125359 A1 | 5/2009 | Knapic et al. | |
| 2009/0132176 A1 | 5/2009 | McConnell et al. | |
| 2009/0171722 A1 | 7/2009 | Roberts | |
| 2009/0171992 A1 | 7/2009 | Roberts | |
| 2009/0199113 A1 | 8/2009 | McWhinnie | |
| 2009/0204916 A1 | 8/2009 | Benedek et al. | |
| 2009/0248854 A1 | 10/2009 | Conway | |
| 2009/0281845 A1* | 11/2009 | Fukuda et al. | 705/7 |
| 2010/0049595 A1* | 2/2010 | Parry | 705/11 |
| 2010/0070404 A1 | 3/2010 | McConnell et al. | |
| 2010/0070423 A1 | 3/2010 | McConnell et al. | |
| 2010/0138353 A1 | 6/2010 | Srivastava et al. | |
| 2010/0280962 A1 | 11/2010 | Chan | |
| 2010/0318200 A1* | 12/2010 | Foslien et al. | 700/83 |

OTHER PUBLICATIONS

Reigle, Jennifer A. (2000). Development of an integrated project-level pavement management model using risk analysis. Ph.D. dissertation, West Virginia University, United States—West Virginia.*

Thibadeau, B.. Stochastic optimization models for contingency allocation in project management. Ph.D. dissertation, The University of Tennessee, United States—Tennessee.*

Maximizing Success in Lean Project Management Leadership (Presentation Supporting Paper) Travis Huber. IIE Annual Conference. Proceedings. Norcross: 2002. p. 1 (10 pages).*

Christian Timpe. (2002). Solving planning and scheduling problems with combined integer and constraint programming. OR Spectrum, 24(4), 431-448.*

Mercer et al., U.S. Appl. No. 12/765,918, "System and Method for Evaluating Sustainability Projects of an Organization," 40 pages, filed Apr. 23, 2010.

Clark et al., U.S. Appl. No. 12/765,947, "System and Method for Managing Sustainability for an Organization," 43 pages, filed Apr. 23, 2010.

Clark et al., U.S. Appl. No. 12/765,991, "System and Method for Managing Sustainability for an Organization," 42 pages, filed Apr. 23, 2010.

Clark et al., U.S. Appl. No. 12/766,012, "System and Method for Managing Stakeholder Impact on Sustainability for an Organization," 42 pages, filed Apr. 23, 2010.

Clark et al., U.S. Appl. No. 12/766,027, "System and Method for Managing Sustainability for an Organization," 40 pages, filed Apr. 23, 2010.

Office Action Summary issued by the USPTO for U.S. Appl. No. 12/765,918, filed Apr. 23, 2010, May 17, 2012.

Office Action Summary issued by the USPTO for U.S. Appl. No. 12/765,918, filed Apr. 23, 2010, Dec. 6, 2012.

Examiner's Answer to Appeal Brief, Jul. 19, 2013.

Non-final Office Action issued by the USPTO for U.S. Appl. No. 12/765,947, filed Apr. 23, 2010, Jan. 3, 2012.

Non-final Office Action issued by the USPTO for U.S. Appl. No. 12/765,947, filed Apr. 23, 2010, Nov. 23, 2012.

Final Office Action issued by the USPTO for U.S. Appl. No. 12/765,947, filed Apr. 23, 2010, Apr. 18, 2013.

Non-final Office Action issued by the USPTO for U.S. Appl. No. 12/765,991, filed Apr. 23, 2010, Jun. 8, 2012.

Final Office Action issued by the USPTO for U.S. Appl. No. 12/765,991, filed Apr. 23, 2010, Mar. 5, 2013

Non-final Office Action issued by the USPTO for U.S. Appl. No. 12/766,012, filed Apr. 23, 2010, Oct. 9, 2012.

Final Office Action issued by the USPTO for U.S. Appl. No. 12/766,012, filed Apr. 23, 2010, Apr. 2, 2013.

Non-final Office Action issued by the USPTO for U.S. Appl. No. 12/766,027, filed Apr. 23, 2010, Feb. 2, 2012.

Non-final Office Action issued by the USPTO for U.S. Appl. No. 12/766,027, filed Apr. 23, 2010, Dec. 14, 2012.

Srivastava et al., U.S. Appl. No. 61/092,387, filed Aug. 27, 2008, pp. 1-77.

Carbon Footprint Calculator, the Nature Conservancy, nature.org Jul. 2007, Mar. 2008 and Apr. 2008. pp. 1-16.

Notice of Allowance and Fee(s) Due mailed Oct. 1, 2013, re: U.S. Appl. No. 12/766,012, in the name of Terrence G. Clark et al.

* cited by examiner

| Project Functional Matrix - Alignment Scoring | | | | | | | [--Actions--] ▼ ◻ ◱ ◰ |
|---|---|---|---|---|---|---|---|
| Functional Department / Project △ | Cut Costs Expected Alignment | Reduce Carbon Expected Alignment | Enhance Reputation Expected Alignment | Increase Revenue Expected Alignment | Annual Emission Reduction Target (Metric Tonnes) | Planned Annual Energy Reduction (kWh) | Planned NPV |
| ⊟ Corporate Communications | | | | | 0 | 0 | -10,000.00 |
| ⊟ Community Relations | | | | | | | |
| ☐ UN Global Compact | ◈ 0 | ◈ 2 | ◈ 25 | ◈ 7 | 0 | 0 | -10,000.00 |
| ⊟ Facilities | | | | | 16,567 | 46,567,000 | 30,917,000.00 |
| ⊟ Energy Audit | | | | | | | |
| ☐ CA locations - Worldview energy audit | ◈ 22 | ◈ 24 | ◈ 4 | ◈ 0 | 7,500 | 32,000,000 | 3,968,000.00 |
| ☐ HVAC Audit | ◈ 25 | ◈ 23 | ◈ 18 | ◈ 0 | 1,567 | 4,567,000 | 2,159,000.00 |
| ⊟ Insulation | | | | | | | |
| ☐ Building Insulation | ◈ 19 | ◈ 21 | ◈ 15 | ◈ 0 | 7,500 | 10,000,000 | 24,790,000.00 |
| ⊟ LEED Certification | | | | | | | |
| ☐ CA real estate will seek to lease space | ◈ 21 | | | | | | |
| ⊟ Global Administration | | | | | 1,250 | 1,650,000 | 4,053,000.00 |
| ⊟ Paper Reduction | | | | | | | |
| ☐ CA Travel Paperless Tickets & Receipts | ◈ 23 | 10 | ◈ 19 | ◈ 0 | | | 3,900,000.00 |
| ☐ North American FY09 Print Strategy | ◈ 22 | ◈ 18 | 10 | ◈ 0 | 1,250 | 1,650,000 | 100,000.00 |
| ⊟ Supplier Assessment | | | | | | | |
| ☐ CA Global Procurement evaluating all procedures | ◈ 24 | | ◈ 24 | | | | |
| ⊞ Telepresence and Communications | | | | | | | |
| ⊞ Waste Stream | | | | | | | |

| ecoSource | | | | | | | | [--Actions--] ▼ |
|---|---|---|---|---|---|---|---|---|
| Filter [--Select--] ▼ | | | | | | | | [ Expand Filter ] |
| New ✓ Delete | | | | | | | | |

| | Name △ | Description | Category | Source Unit | Emission | Scope | Energy | Aggregate Data | Active |
|---|---|---|---|---|---|---|---|---|---|
| ☐ | Air Travel (Long Haul) | Employee business travel by commercial airline - Long Haul | Business Travel | Miles | CO2e | Scope 3 - Other | | Yes | ✓ |
| ☐ | Air Travel (Medium Haul) | Employee business travel by commercial airline - Medium Haul | Business Travel | Miles | CO2e | Scope 3 - Other | | Yes | ✓ |
| ☐ | Air Travel (Short Haul) | Employee business travel by commercial airline - Short Haul | Business Travel | Miles | CO2e | Scope 3 - Other | | Yes | ✓ |
| ☐ | Anthracite | A hard, compact variety of mineral coal that has a high lustre. It has the highest carbon count and contains the fewest impurities of all coals, despite its lower calorific content. | Coal | Tonne | CO2e | Scope 1 - Manufacturing Process Emissions | ✓ | | ✓ |
| ☐ | Aviation Gasoline | A specialized type of petroleum-based fuel used to power aircraft. It is generally of a higher quality than fuels used in less critical applications such as heating or road transport, and often contains additives to reduce the risk of icing or explosion due to high temperatures, amongst other properties | Petroleum | Gallons (US) | CO2e | Scope 1 - Mobile Combustion | ✓ | Yes | ✓ |
| ☐ | Bituminous Coal | is a relatively soft coal containing a tarlike substance called bitumen. It is of higher quality than lignite coal but of poorer quality than anthracite coal. | Coal | Tonne | CO2e | Scope 1 - Manufacturing Process Emissions | ✓ | Yes | ✓ |
| ☐ | Distillate Fuel & Diesel | No. 1, No. 2, No. 4 Fuel Oil and Diesel | Petroleum | Gallons (US) | CO2e | | ✓ | Yes | ✓ |
| ☐ | Electricity | Consumed electricity from the power grid | Electricity | kWh | CO2e | Scope 2 - Indirect | ✓ | Yes | ✓ |
| ☐ | Flare Gas | A gas flare or flare stack is an elevated vertical stack or chimney found on oil wells or oil rigs, and in refineries, chemical plants and landfills used for burning off unwanted gas or flammable gas and liquids released | Natural Gas and Gaseous Fuels | Cubic Meters (Gas) | CO2e | Scope 1 - Manufacturing Process Emissions | | | ✓ |

Key Indicators by Business Objectives    [--Actions--]

| Business Objective / Key Indicator △ | Business Objective Description | State | Trend | Aggregation Value | Type | Aggregation Date |
|---|---|---|---|---|---|---|
| ⊟ Cut Costs | Cut expenditure and increase efficiency as a result of engaging in energy and green initiatives. | | | | | |
| ☐ Data Center Combined Energy Consumption | | ◇ | ⇨ | 962,331 | Performance | 3/20/09 |
| ☐ US Airline Business Travel Expenditure | | | ⇧ | | Performance | 3/20/09 |
| ⊟ Enhance Reputation | Enhance the reputation and standing of the organization among customers, members of the public, employees, and other groups. | | | | | |
| ☐ Customer Sat: Social Responsibility Approval Rating | | | ⇧ | | Performance | 3/31/09 |
| ⊟ Increase Revenue | Increase revenue derived from software products and other accompanying revenue streams. | | | | | |
| ☐ Product Sales Revenue: EcoProducts BU | | | ⇧ | | Performance | 3/31/09 |
| ☐ Product Sales Revenue: Project GreenTek | | | ⇧ | | Performance | 3/31/09 |
| ☐ Renew Rate: Environmental Services Subscription Plan | | | ⇧ | | Performance | 3/31/09 |
| ⊟ Reduce Carbon | Reduce the quantity of $CO_2e$ emitted as a result of the organization and its activities. | | | | | |
| ☐ Carbon Footprint (Global) | | ◇ | ⇦ | 60 | Performance | 3/31/09 |
| ☐ CDP CDLI Score (Annual) | | | ⇧ | | Performance | 3/31/09 |
| ☐ US Airline Business Travel Expenditure | | | ⇧ | | Performance | 3/20/09 |

| Stakeholder Mapping | | | | | [--Actions--] |
|---|---|---|---|---|---|
| Stakeholder / Project △ | Stakeholder Category | Relationship | Extent | Sustainability Category | Project Status |
| ⊟ Building Technologies, Inc. | Partner or Supplier | | | | |
| ☐ Betas On Demand | | Influences | Minimal | Virtualization | Approved |
| ☐ Building Insulation | | Influences | Very Strong | Insulation | Unapproved |
| ⊟ CA | Internal | | | | |
| ☐ UN Global Compact | | Approves | Definitive | Community Relations | Approved |
| ⊟ CA Enterprise Accounts | Customer | | | | |
| ☐ Product Delivery : Electronic Software Delivery | | Impacted | Strong | Enhance Existing Product | Unapproved |
| ⊞ Canon, Inc. | Partner or Supplier | | | | |
| ⊟ Carbon Disclosure Project (CDP) | NGO | | | | |
| ☐ Betas On Demand | | Influences | Minimal | Virtualization | Approved |
| ⊟ Corporate CEO | Internal | | | | |
| ☐ CA locations - Worldview energy audit | | Influences | Moderate | Energy Audit | Approved |
| ⊟ Corporate Office of Sustainability | Internal | | | | |
| ☐ CA locations - Worldview energy audit | | Influences | Moderate | Energy Audit | Approved |
| ⊟ Employees | Internal | | | | |
| ☐ Building Insulation | | Impacted | Minimal | Insulation | Unapproved |
| ☐ CA locations - Worldview energy audit | | Impacted | Minimal | Energy Audit | Approved |
| ☐ CA Travel Paperless Tickets & Receipts | | Impacted | Very Strong | Paper Reduction | Approved |
| ☐ North American FY09 Print Strategy | | Impacted | Strong | Paper Reduction | Approved |
| ☐ Server Consolidation | | Impacted | Minimal | Server and System Consolidation | Approved |
| ☐ Sustainable Pantry Program | | Impacted | Moderate | Waste Stream | Approved |
| ⊞ Forward Catering, Inc. | Partner or Supplier | | | | |

FIG. 10

Supplier Sustainability Assessment

Filter [ Completed Assessments ▽ ]  [ Expand Filter ]

Bar chart — Assessment Score:
- MJLP GmbH: 7.7
- Jessop Jones, Ltd.: 3.1
- Jansen Roper: 2.2
- Hirsch & Jeffries: 6.4
- Cromwell Croft plc: 5.7
- Broadfield: 5.0
- Basset Riley Wright: 8.0

Supplier Assessment Progress — pie chart: 62%, 15%, 15%, 8%
Legend: Not Started, In Progress, On Hold, Completed

Supplier Assessment Summary

Filter [ --Select-- ▽ ]  [ Expand Filter ]

| Company △ | Company Type | Assessment Score | Number of Employees | Carbon Emissions | Energy Efficiency | Buildings & Facilities | Water Use | Waste & Recycling | Environmental Safety | Product & Services | Transportation & Travel | Supply Chain | Standards & Reporting | Assessment Status |
|---|---|---|---|---|---|---|---|---|---|---|---|---|---|---|
| Basset Riley Wright | Vendor | ▽ 8.0 | 60,300 | ◇ | ◇ | ◇ | ◇ | ◇ | ◇ | ◇ | ◇ | ◇ | ◇ | ✓ Completed |
| Broadfield | Vendor | △ 5.0 | 35,000 | ◇ | ◇ | ✕ | ◇ | ◇ | ◇ | ◇ | ◇ | ◇ | ◇ | ✓ Completed |
| Cromwell Croft plc | Vendor | △ 5.7 | 30,000 | ◇ | ◇ | ✕ | ◇ | ◇ | ◇ | ◇ | ◇ | ◇ | ◇ | ✓ Completed |
| Hirsch & Jeffries | Vendor | △ 6.4 | 55,500 | ◇ | ◇ | ◇ | ◇ | ◇ | ◇ | ◇ | ◇ | ✕ | ◇ | ✓ Completed |
| Jansen Roper | Vendor | ✕ 2.2 | 65,000 | ◇ | ◇ | ✕ | ◇ | ✕ | ◇ | ◇ | ◇ | ◇ | ◇ | ✓ Completed |
| Jessop Jones, Ltd. | Project Partner | ✕ 3.1 | 2,300 | ◇ | ◇ | ✕ | ◇ | ◇ | ◇ | ◇ | ◇ | ◇ | ✕ | ✓ Completed |
| MJLP GmbH | Vendor | △ 7.7 | 13,200 | ◇ | ◇ | ◇ | ◇ | ◇ | | ◇ | ◇ | ◇ | ◇ | ✓ Completed |

Total Results: 7

SYSTEM AND METHOD FOR ALIGNING PROJECTS WITH OBJECTIVES OF AN ORGANIZATION

RELATED APPLICATION

This application claims the benefit under 35 U.S.C. §119(e) of U.S. Provisional Application Ser. No. 61/240,968 filed Sep. 9, 2009.

TECHNICAL FIELD

This invention relates generally to computer management, and more particularly to a system and method for aligning projects with objectives of an organization.

BACKGROUND

Many business organizations are being pressured to report on their carbon footprint and to achieve environmental sustainability goals. The task of accurately reporting the collective resources consumed and expended by an organization, however, has considerable complexity for some organizations. For example, some organizations may engage in various different types of activities affecting the environment. Additionally, some organizations may have multiple facilities remotely located from each other. Various attempts at tracking sustainability information from diverse sources is often time-consuming and error-prone to the point that efficiently measuring and managing progress toward sustainability goals has traditionally been difficult if not untenable. Another challenge to managing sustainability for an organization is that some organizations may have multiple stakeholders with divergent objectives.

Overview

According to one embodiment, a computer-implemented method for aligning projects with an objective of an organization is disclosed. The method may include storing in a computer system a representation of an objective of an organization. The method may further include storing in the computer system a plurality of sustainability projects of the organization. Additionally, the method may include establishing a computer-based logical link between the objective of the organization and at least some of the plurality of sustainability projects of the organization. In certain embodiments, the method may include receiving from the computer system data representing one or more respective metrics for each of the at least some of the plurality of sustainability projects of the organization. The method may further include generating one or more key performance indicators for each of the at least some of the plurality of sustainability projects of the organization. Each key performance indicator may indicate a contribution of a particular sustainability project of the organization towards achieving the objective of the organization.

Certain embodiments may provide one or more technical advantages. For example, particular embodiments may facilitate defining objectives for an organization. Certain embodiments may provide automated and customizable data collection and feedback based on a variety of progress indicators. In some embodiments, the feedback may be used to inform a decision-making process and to maintain or advance the defined objectives. Some embodiments may be implemented as Software as a Service (SaaS), whereby a provider may license and/or host all or a part of an application for use as a service on demand. Alternative embodiments may be hosted and implemented locally (e.g., using a standalone program installed at a local machine or network). Certain embodiments may provide all, some, or none of these advantages. Certain embodiments may provide one or more other technical advantages, one or more of which may be apparent to those skilled in the art from the figures, descriptions, and claims included herein.

BRIEF DESCRIPTION OF THE DRAWINGS

For a more complete understanding of the present invention and advantages thereof, reference is now made to the following description taken in conjunction with the accompanying drawings, in which:

FIGS. 3 through 10 are example GUI dashboards that may be generated by the system of FIGS. 1A and 1B according to various embodiments.

DESCRIPTION OF EXAMPLE EMBODIMENTS

The present disclosure generally relates to systems and methods for managing objectives for an organization. In general, particular embodiments may facilitate defining objectives for an organization and may further provide automated and customizable data collection and feedback based on a variety of progress indicators. In some embodiments, the feedback may be used to inform a decision-making process and to maintain or advance the defined objectives. Some embodiments may be implemented as Software as a Service (SaaS), whereby a provider may license and/or host all or a part of an application for use as a service on demand. Alternative embodiments may be hosted and implemented locally (e.g., using a standalone program installed at a local machine or network). Particular example embodiments are explained in the context of objectives related to environmental sustainability, such as, for example, managing energy usage, energy spend, and/or greenhouse gas (GHG) emissions for all or a portion of an organization. It should be understood at the outset, however, that although example embodiments are explained in the context of objectives in terms of sustainability, various embodiments may be capable of managing a variety of alternative objectives. Additionally, the present disclosure should in no way be limited to the example embodiments, drawings, and techniques disclosed.

Figure 1A:
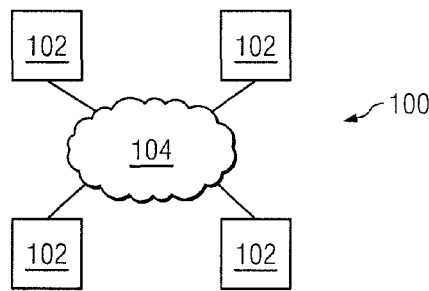
FIGS. 1A through 1B are example block diagrams illustrating a portion of a system for managing sustainability according to one embodiment.

FIG. 1A is one example of a block diagram illustrating a portion of a data processing system 100. In particular embodiments, data processing system 100 is capable of facilitating the management of sustainability for an organization. In the illustrated example, system 100 generally includes a plurality of computing systems 102 coupled together through a network 104. As used throughout this document, the term "couple" and/or "coupled" refers to any direct and/or indirect communication between two or more elements, whether or not those elements are in physical contact with one another.

Each computing system 102 may comprise any computing and/or communication device capable of enabling the communication of information to and/or from network 104 or another component in system 100. In some embodiments, a particular computing system 102 may enable the communication of information to and/or receive information from one or more other computing systems 102 or some other component of system 100.

In some cases, each computing system 102 may include any combination of software, hardware, and/or firmware capable of receiving input, generating data, processing data, recording data, executing logic, and/or enabling the communication of information to and/or from network 104 or another component in system 100. For example, particular computing systems 102 may include one or more wireless devices, voice over Internet protocol (IP) devices, desktop computers, laptop computers, personal digital assistants, cell-phones, telephones, Wi-Fi devices, workstations, mainframe computers, mini-frame computers, servers (including web servers), routers, data bases, directories, any combination of the preceding, or any other computing and/or communicating devices.

In particular embodiments, computing systems 102 may include one or more data repositories capable of recording data. The data may be received from any suitable data source. For example, in certain embodiments the data may be collected using manual input and/or the data may be provided by one or more meters or sensors. Each meter and/or sensor may be capable of measuring one or more of the following: energy; resource use and/or consumption; physical or environmental characteristics of components, processes and/or facilities associated with system 100; and/or some other measureable factor related to organizational objectives. For example, meters or sensors may be capable of measuring kilowatt-hours of electricity consumed or produced by a facility, carbon dioxide emissions produced by a facility, etc.

In various embodiments, system 100 may include one or more meters or sensors. For example, particular meters or sensors may be capable of generating an output based on physical measurements and communicating the output to network 104 or another component in system 100. In an alternative embodiment, system 100 may use data provided by meters and/or sensors that are external to system 100. For example, the output of one or more meters and/or sensors external to system 100 may be derived from a statement that accounts for activity of electricity, gas, water, waste, emitted gases, etc.

In these examples, one or more computing systems 102 communicate with one or more other computing systems 102 through network 104. Network 104 may comprise any wireless network, wireline network, or combination of wireless and wireline networks capable of supporting communication between network elements using ground-based and/or space-based components. In various embodiments, network 104 may be capable of transmitting audio, video, signals, data, messages, or any combination of these or other communication signals. For example, network 104 may comprise a data network, a public switched telephone network (PSTN), an integrated services digital network (ISDN), a local area network (LAN), a wide area network (WAN), a metropolitan area network (MAN), all or a portion of the global computer network known as the Internet, and/or other communication systems or combination of communication systems at one or more locations. Although FIG. 1 illustrates computing systems 102 coupled to each other through network 104, the communication between some computing systems 102 may be performed internally, such as, for example, via a system bus.

Figure 1B:
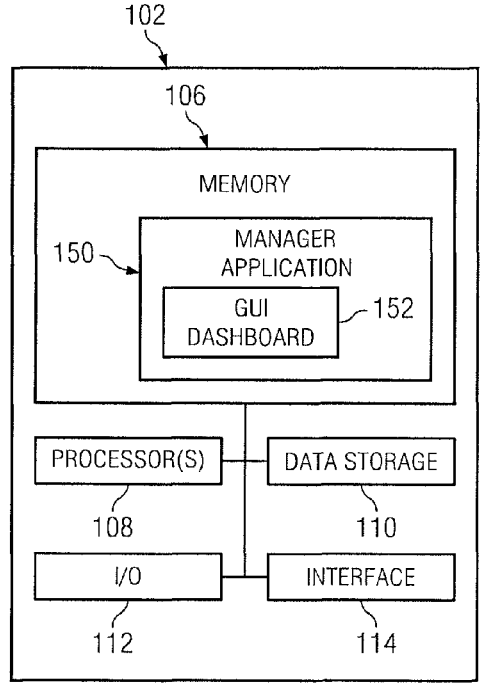

FIG. 1B is one example embodiment of a block diagram illustrating a portion of at least one of the computing systems 102 of FIG. 1A. In this example, computing system 102 includes at least one memory module 106, processor 108, data storage device 110, input/output functionality 112, and interface 114. Although this embodiment includes memory module 106, processor 108, data storage device 110, input/output functionality 112, and interface 114, other embodiments may exclude one or more of memory module 106, processor 108, data storage device 110, input/output functionality 112, and interface 114 without departing from the scope of the present disclosure.

In this embodiment, computing system 102 may include a manager application 150 residing in memory module 106. Manager application 150 may comprise, for example, software, firmware, code, portions of code, data compilations, content, and/or a combination of these or any other type of data. As explained further below, manager application 150 may include a variety of software objects and a module for generating graphical user interface (GUI) dashboards 152. Although manager application 150 resides within memory module 106 in this example, all or a portion of manager application 150 may alternatively reside at any other suitable location, such as, for example, external to memory module 106 and/or external to computing system 102. In some embodiments, manager application 150 may be embodied or recorded on any of a variety of other suitable tangible, non-transitory computer-readable medium, such as, for example, removable computer-readable media. In particular embodiments, manager application 150 may be hosted at one or more computing systems 102 under a SaaS model of software deployment. The computing systems 102 hosting manager application 150 may, for example, be configured to receive data communicated via network 104 from other computing systems 102. Alternative embodiments may be hosted and implemented locally (e.g., using a standalone program installed at a local machine or network).

In various embodiments, manager application 150 may be structurally and/or functionally interrelated to particular tangible, non-transitory computer-readable media in the form of memory module 106 or other tangible, non-transitory computer-readable media, which computer-readable media may at least partially enable the functions of manager application 150 to be realized. Additionally, manager application 150 may be structurally and/or functionally interrelated to one or more processors 108. Processor 108 may refer, for example, to the portion of computing system 102 capable of carrying out instructions of a computer program. In certain embodiments, processor 108 may comprise the primary element or elements executing or realizing various logic-based functions, including, for example, the functions of manager application 150.

In operation of particular embodiments, the execution of manager application 150 by one or more processors 108 may facilitate defining objectives of for organization in terms of environmental sustainability. Additionally, manager application 150 may be capable of providing customizable data collection and feedback based on a variety of progress indicators. The feedback may be presented to the user in a customizable GUI format that enables a number of different hierarchical views of an organization's progress with regards to sustainability objectives. The feedback may also be used to inform a decision-making process and to maintain or advance the defined objectives.

Computing system 102 may also comprise one or more memory modules 106 and/or data storage devices 110. These memory modules 106 and/or data storage devices 110 may comprise any hardware, software, firmware, or combination thereof operable to store and facilitate retrieval of information. The one or more modules 106 and/or data storage devices 110 may store information using any of a variety of information structures, arrangements, and/or compilations. Memory module 106 may, for example, comprise a dynamic random access memory (DRAM), a static random access memory (SRAM), a NAND flash memory, or any other suitable volatile or nonvolatile storage and retrieval device or combination of devices. Data storage device 110 may comprise, for example, one or more databases, computer components, devices, and/or recording media capable of retaining digital data. Data storage device 110 may, for example, comprise a magnetic data storage device (e.g., a diskette or a hard disk drive), an optical disc storage medium (e.g., a Laserdisc), a magneto-optical disc-based data storage device (e.g., a MiniDisc), a dynamic random access memory (DRAM), a static random access memory (SRAM), a NAND flash memory, or any other suitable volatile or nonvolatile storage and retrieval device or combination of devices.

The one or more memory modules 106 and/or data storage devices 110 may comprise any number of storage media without departing from the scope of the present disclosure. Additionally, all or part of the one or more memory modules 106 and/or data storage devices 110 could reside locally within computer system 102 or could reside in a location remote from and accessible to computer system 102 (e.g., at some other computing system 102, within removable media, and/or at an external database). Computing systems 102 could communicate with the one or more memory modules 106 and/or data storage devices 110 through network 104 or, in other embodiments, computing system 102 could communicate with the one or more memory modules 106 and/or data storage devices 110 using direct links.

Input/output ("I/O") functionality 112 may comprise, for example, any communication method between computing systems 102 and/or within a particular computing system 102 (e.g., from an image buffer to a display). In some embodiments, input functionality may comprise, for example, the receiving signals or data by a computing system 102 using a standard or non-standard communication method. In other embodiments, output functionality may comprise, for example, the communication of signals or data by a computing system 102 using a standard or non-standard communication method. These terms may also refer to part of an action, such as, for example, to "perform I/O" may involve performing an input and/or output operation. In some cases, devices for communication between computing systems 102 may be used to implement both input and output functionality.

Interface 114 may comprise, for example, any device(s) that may be used (e.g., by a person, or by another device or system) to communicate with a particular computing system 102. For example, keyboards and mice may be considered input interfaces 114 of some computing systems 102, while monitors and printers may be considered output interfaces of some computing systems 102.

Figure 2:
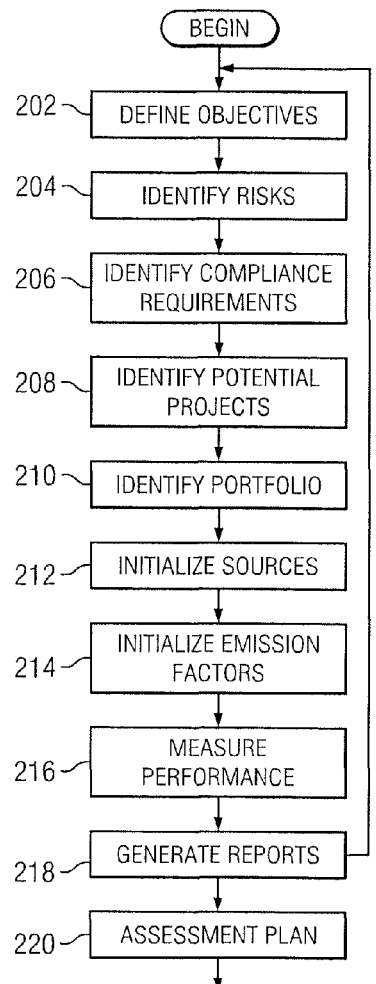
FIG. 2 is an example flowchart illustrating steps that may be implemented at least in part by the system of FIGS. 1A and 1B.

FIG. 2 is one embodiment of a flowchart 200 illustrating example steps that may be implemented by the data processing system 100 of FIG. 1. In general, flowchart 200 includes steps related to developing a strategy of objectives, risk management, compliance management, project management, portfolio management, performance management, and idea management. Although this example is explained in the context of sustainability, manager application 150 may be capable of facilitating the management of a variety of alternative objectives.

In step 202, sustainability objectives may be defined. For example, manager application 150 may prompt a user to input environmental sustainability objectives. In certain embodiments, manager application 150 may prompt a user to input environmental sustainability objectives by performing one or more of the following steps: asking the user a series of questions, receiving user responses to the series of questions, determining various environmental sustainability objectives that may be related to the received user responses, and providing a selection of potential environmental sustainability objectives to the user based on the determination. In a particular embodiment, objectives for an organization and/or a particular division of an organization may include reducing the carbon footprint by a particular amount, reducing energy consumption by a certain percentage within a particular time frame, increasing renewable energy production, etc.

In step 204, risk attributes may be identified. For example, manager application 150 may prompt a user to input risk attributes. Risk attributes may include, for example, funding capabilities of an organization, technical complexities of sustainability projects, environmental impact of various activities, and/or a variety of other risk attributes that may be related to the sustainability objectives defined in step 202. In particular embodiments, manager application 150 may provide a user with an option to select from a set of risk attributes. The set provided to the user may be based upon the sustainability objectives defined in step 202. For example, manager application 150 may automatically perform a query or a lookup (e.g., using data storage device 110) based upon the sustainability objectives defined in step 202 and manager application 150 may return a corresponding subset of risk attributes related to those objectives. Manager application 150 may be capable of providing a user the option to select among the returned subset of risk attributes, to modify the returned subset of risk attributes, and/or to input alternative risk attributes.

In step 206, compliance requirements may be identified. For example, manager application 150 may prompt a user to input measurable performance expectations for the organization related to environmental sustainability, such as, for example, internal policies related to energy consumption and/or GHG emission reduction targets. Additionally, manager application 150 may prompt a user to input various parameters describing an organization and, in response to the user's input, manager application 150 may automatically output suggested compliance requirements based upon a predefined relationship between those parameters and potentially applicable environmental regulations. Manager application 150 may further be capable of providing a user the option to select among the suggested compliance requirements, to modify the suggested compliance requirements, and/or to input alternative requirements.

In step 208, potential projects are identified. In particular embodiments, each project generally includes initiatives, ideas, and/or planned activities generally related to advancing one or more objectives. According to one embodiment, manager application 150 may retrieve project submissions provided by various sources (e.g., via a webpage) that may be internal and/or external to an organization. Additionally, manager application 150 may enable a user to categorize project submissions and provide a GUI that is logically structured to facilitate browsing for project submissions on particular topics, scope, costs, carbon mitigation, etc. Manager application 150 may further be capable of providing a user the option to add comments or otherwise modify particular projects, to group projects (e.g., into folders and/or hierarchical directories), and/or to input alternative projects. In various embodiments, projects and/or their foundational ideas may be categorized using a hierarchical categorization.

In step 210, a potential project portfolio is identified. For example, manager application 150 may enable user to evaluate project submissions and promote those projects deemed worthy of further examination by submitting scores, which may be received and recorded by manager application 150. In various embodiments, manager application 150 may summarize project scores submitted by users and indicate those projects considered to be the best possible initiatives. In addition, manager application 150 may be capable of automatically indicating, and/or enable a user to indicate, those projects that are most likely to further objectives identified in step 202. In some embodiments, manager application 150 may further be capable of providing a user the option to weight the scores of those projects indicated as being the most likely to further the identified objectives.

Step 210 may further include comparing environmental improvement projects using a number of alternative considerations. For example, manager application 150 may prompt a user to input various environmental, financial, and social considerations for particular projects identified in step 208. According to one embodiment, environmental considerations may include the potential impact of a particular project on the carbon footprint of an organization and/or resource optimization. Particular financial considerations may, for example, be measured in terms of pure cost, return on investment (ROI), net present value (NPV), and projected breakeven point. Social considerations may, for example, include an estimated score of how favorably or unfavorably the project may be perceived by those holding a stake in the organization (e.g., collected via supplier assessments, customer assessments, etc.). In particular embodiments, manager application 150 may be capable of providing a user the option to modify or otherwise weight recorded scores in a manner that reflects these alternative considerations. In various embodiments, the comparison may be illustrated in a GUI dashboard.

FIG. 3 is one example embodiment of a GUI dashboard 152 that may be used in step 210 to assist a user in identifying a project portfolio. In this example, potential projects are organized into rows according to a three-level hierarchy. Although this example includes a three-level hierarchy, any other hierarchy may be used without departing from the scope of the present disclosure. In this example, the first four columns (e.g., cut costs, reduce carbon, enhance reputation, and increase revenue) correspond to four identified high-level organizational objectives. As part of the project approval process, each potential project may be evaluated against the higher-level objectives and scored as to how they are expected to align. If other project attributes (e.g., ROI, projected breakeven point, etc.) are comparable, the projects selected for execution may include those with the highest expected alignment scores.

Based on one or more results of steps 202, 204, 206, 208 and/or 210, manager application 150 may be capable of providing holistic views that may be used to compare potential projects in terms of a cost/benefit analysis. Using these view-based comparisons, a user may be able to strategically select a potential project portfolio that includes those projects anticipated to collectively optimize a cost-to-benefit ratio. Manager application 150 may further be capable of providing a user the option to modify the composition of a project portfolio and/or group projects into alternative project portfolios.

Steps 212 through 220 generally relate to the feedback loop that may be used to capture, calculate, and/or measure information about environmental activity, impacts, and performance. In particular embodiments, this information may be used to inform the decision-making process and to maintain or advance organizational objectives.

In step 212, a software object referred to herein as one (or more) instances of "source" is initialized. For example, manager application 150 may prompt a user to input various characteristics defining diverse activities of an organization, which in some cases may facilitate measuring the environmental impact of such activities. In various embodiments, the characteristics defined in step 212 may be used to perform detailed sustainability analyses, as explained further below.

FIG. 4 is one example embodiment of GUI dashboard 152 that illustrates various types of activities of an organization that are each linked to a respective source object. In this example, air travel is partially defined in terms of miles traveled, electricity consumption from a power grid is partially defined in terms of kilowatt-hours, and particular manufacturing processes may be partially defined in terms of tons of coal consumed. Although particular examples of activities are disclosed, any other activity of an organization or division of an organization may be evaluated without departing from the scope of the present disclosure. Each of these activities may directly and/or indirectly contribute to carbon emissions. As shown in FIG. 4, each activity is further defined in terms of category. In some cases, activities may be defined in terms of location, which may be relevant, for example, if an organization spans one or more power grids supported by different energy sources (e.g., coal-fired power versus renewable energy sources). Additionally, instances of the source object may extend into business characterizations of an organization including, for example, revenue, inventory, and/or any other business-related basis that an organization might use to help measure the environmental impact of a business-related activity.

Figure 5:
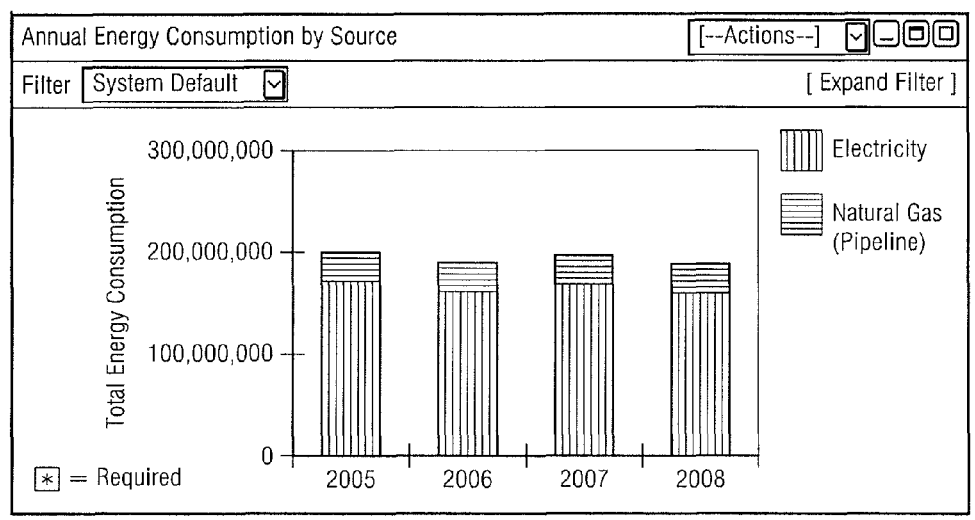

As data processing system 100 records various activities, the pertinent characteristics of the source object are inherited or logically linked into the resulting activity. As such, the environmental impact of disparate activities may be readily quantifiable, aggregated, and compared on an apples-to-apples basis. As illustrated in FIG. 5, for example, manager application 150 may be capable of providing a GUI dashboard 152 that shows total energy consumption aggregated by source and year. Although this example compares energy consumption, any other environmental impact comparison may be used without departing from the scope of the present disclosure.

In various embodiments, manager application 150 may enable a user to modify characteristics of a source and may further respond to such modification by dynamically updating previously recorded data. As time progresses, source instances can be modified, added, and/or removed as desired to meet the changing needs of an organization.

In step 214, a software object referred to herein as one (or more) instances of "emission factor" is initialized. For example, manager application 150 may prompt a user to identify, for each organizational activity tracked by data processing system 100, a representative value that relates the quantity of one or more GHG emissions released to the atmosphere (or some other sustainability factor) with an activity associated with the release of that emission. In particular embodiments, emission factors may be expressed as the weight of pollutant divided by a unit mass, volume, distance, or duration of the activity emitting the pollutant (e.g., kilograms of carbon dioxide per kilowatt-hour of electricity consumed). Various emission factors may be dependent upon date, location, and/or source. For example, electricity consumption at a particular location powered by a hydro plant may have a smaller emission factor for one or more types of GHG emissions than electricity consumption at another location powered by a coal plant.

In various embodiments, the emission factor object structure may be designed to ensure an organization maintains critical data regarding an emission factor. For example, data processing system 100 may retain data about the emission factor itself, the source from which it is derived, and/or may allow the user to attach related documentation. In some cases, data is maintained to record the time-period relevant to the emission factor and/or a time-stamp of when the emission factor was last examined for accuracy. In particular embodiments, the granularity of the emission factor can be recorded as CO2e and/or as an individual emission gas.

In various embodiments, manager application 150 may enable a user to define multiple facilities of an organization using a straightforward hierarchy. For example, a geographical organizational breakdown structure (OBS) may be defined in terms of Company Name→Region→Country State/Province→City. The organization may be given the flexibility to define emission factors at any level of the hierarchy as appropriate. For example, an organization may have 175 facilities using natural gas in North America (region) that can share the same emission factor based upon reliable information about commercial gas furnaces. Rather than tracking 175 separate records, the organization can set this once at the region level. In various embodiments, manager application 150 may be capable of automatically applying the recommended emissions factor to all facilities within the region. Additionally, manager application 150 may enable a user to override this region-level emission factor setting. For example, if a particular facility uses a special type of furnace, a user may be given the option to override a region-based emission factor value by explicitly creating an emission factor for that facility. Manager application 150 may be configured to apply the most granular factor available, by default, thereby potentially enhancing accuracy.

In particular embodiments, manager application 150 may enable a user to modify characteristics of an emission factor. Manager application 150 may further respond to such modification by dynamically updating recorded data. As time progresses, emission factor instances can be modified, added, and/or removed as desired to meet the changing needs of an organization.

Because the emission factor object itself has information regarding the age of the underlying data, manager application 150 may be capable of storing stale data thresholds that ensure out-of-date emission factors are not used. For example, if the explicit emission factor for a Boston office has not been kept current and its review date is older than the user-specified stale data threshold, then manager application 150 may automatically look further up the hierarchy to locate an emission factor that is applicable to the Boston office.

Such a design may provide a variety of useful features. For example, the geographic hierarchy of some emission factors may enable users or manager application 150 to readily identify particular locations or regions that provide the cleanest energy. In some embodiments, manager application 150 may be capable of suggesting the hierarchy level for each emission factor. In certain embodiments, users may be capable of determining the hierarchy level applied for each emission factor. Additionally, emission factors that fall out-of-date may be flagged for review by manager application 150, which may also store an audit trail documenting who reviewed what emission factor and when. An organization may be allowed to set standards for how often emission factors should be reviewed. In some embodiments, users may be able to identify the emission factors used to determine emissions data for any given time period using available emission factors history maintained by manager application 150. Yet another advantage is that setting stale data thresholds may mitigate the risk that the same old data is used year-after-year.

According to a particular embodiment, the processing of emission factors in step 214 may be substantially similar to the following:

```
{
    OBS                              /* Hierarchical OBS structure */
    emission_factor                  /* documented applicable emission */
                                     /* factor */
                                     /* within OBS */
    current_date
    emission_factor_review_date      /* Date Emission Factor was */
                                     /* last reviewed */
    stale_data_threshold             /* user-defined threshold for */
                                     /* acceptable aging of emission factor */
    emission_factor_for_activity     /* emission factor multiplier that will */
                                     /* be used to calc the actual emissions */
                                     /* of the activity */
    Read lowest level of OBS
    do
    {
        If (emission_factor exists)
        {
            If ((current_date – emission_factor_review_date) < stale_data_threshold)
            {
                Copy emission_factor to emission_factor_for_activity
            }
        Read next level of OBS
    } While (emission_factor_for_activity= null)
}
```

In step 216, performance is measured. In various embodiments, manager application 150 may track relevant ecological activity of an organization in a normalized format, referred to herein as the software object "ecoActivity." Ecological activities of an organization that may be tracked by instances of the ecoActivity object may include, for example, waste production, shipping, manufacturing processing, business air travel, etc. Particular instances of the ecoActivity object may track these or other activities in terms of gas consumption, electricity consumption, carbon emissions, cost, employee headcount, affected square footage, ambient temperature, a timeframe of the activity, and/or any of a variety of other quantifiable elements that may or may not be directly related to sustainability. For example, manager application 150 may calculate carbon emissions data in step 216 by linking an ecoActivity instance to a corresponding emission factor. In particular embodiments, the calculated carbon emissions may be measured in terms of CO2e and/or as an individual GHG. In the case of business air travel or shipping, for example, carbon emissions may be calculated as a multiple of distance units (e.g., miles or kilometers traveled), which may be at least partially defined by logically-linked source and emission factor objects.

The normalized data structure provided via the ecoActivity object may enable recording of various related data that can later be used as intensity metrics. In addition, ecoActivity may enable a user to exploit configured characteristics based upon the location and/or type of an activity. As such, an instance of the ecoActivity object may inherit user-defined characteristics. Furthermore, the ecoActivity object may enable a user to aggregate data at a variety of different hierarchical and/or logical levels that may be reported in a variety of useful and flexible ways, as described further below.

Each instance of the ecoActivity object may be recorded in step 216 at any suitable level of granularity. In some embodiments, for example, instances may be recorded at a high-level for a particular country or region. Alternatively, instances may be recorded at a more granular level, such as, for example, by facility, utility account, and/or individual meter. In addition, instances may be recorded at any suitable periodic intervals (e.g., daily, weekly, monthly, quarterly, yearly, etc.) and/or after particular events trigger (e.g., after completion of particular project milestones).

Step 216 may further include populating a portion of a project performance dataset by extrapolating estimated data based on actual measurements. In this manner, gaps within a dataset may be automatically or manually filled, thereby potentially enhancing analytical options available to a user. In particular embodiments, a user may be given the option to either include or exclude extrapolated data from the results during subsequent reporting. Further, a user may optionally identify ecoActivity data as non-aggregated, which in some cases may prevent the data from being included in data aggregation.

In step 218, reports are generated. Throughout this document the term "report" generally refers to any collection of information provided to a user. In various embodiments, the report can comprise, for example, an aggregation and/or a dis-aggregation of information. The information may be provided to the user in a computer-displayable format (e.g., in a PDF format, as a dashboard 152, as a text message, etc.), in a tangible format (e.g. a computer printout, a fax, etc.), and/or any other suitable format for display to a user. For example, manager application 150 may be capable of enabling a user to interface with a variety of GUI dashboards 152 summarizing one or more of the project performance measurements recorded in step 216. In an alternative embodiment, reports may be generated in 218 that indicate performance of all or a portion of the organization in a manner that may not necessarily be defined or bounded in terms of projects. For example, a report may indicate one or more of the following: the carbon footprint of the organization as a whole; energy consumption of particular facilities; shipping in terms of nautical miles attributed to particular organizational divisions or products; and/or any other performance indicator(s) for all or a portion of an organization.

Figure 6:
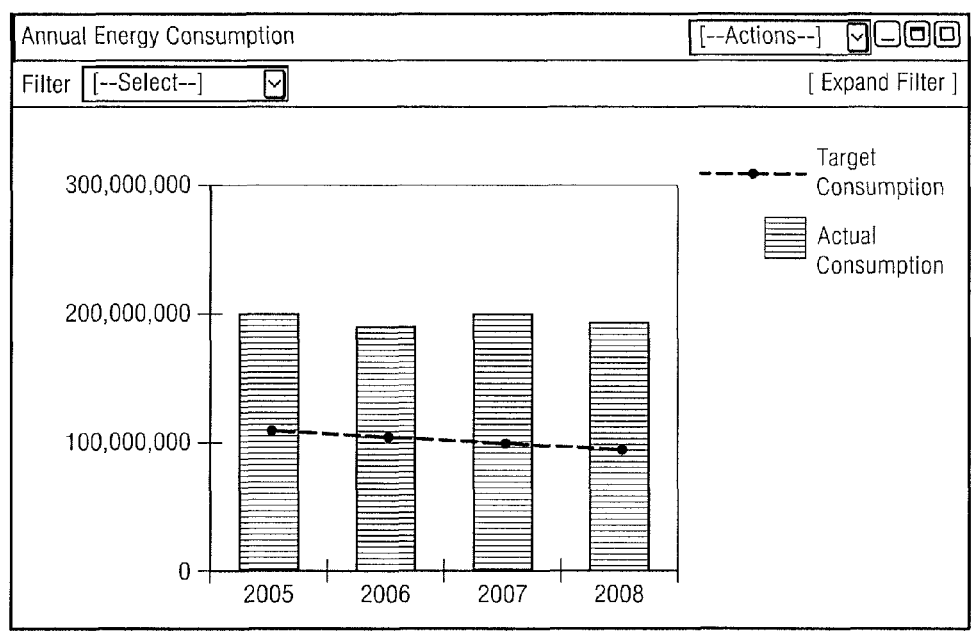
Figure 7:
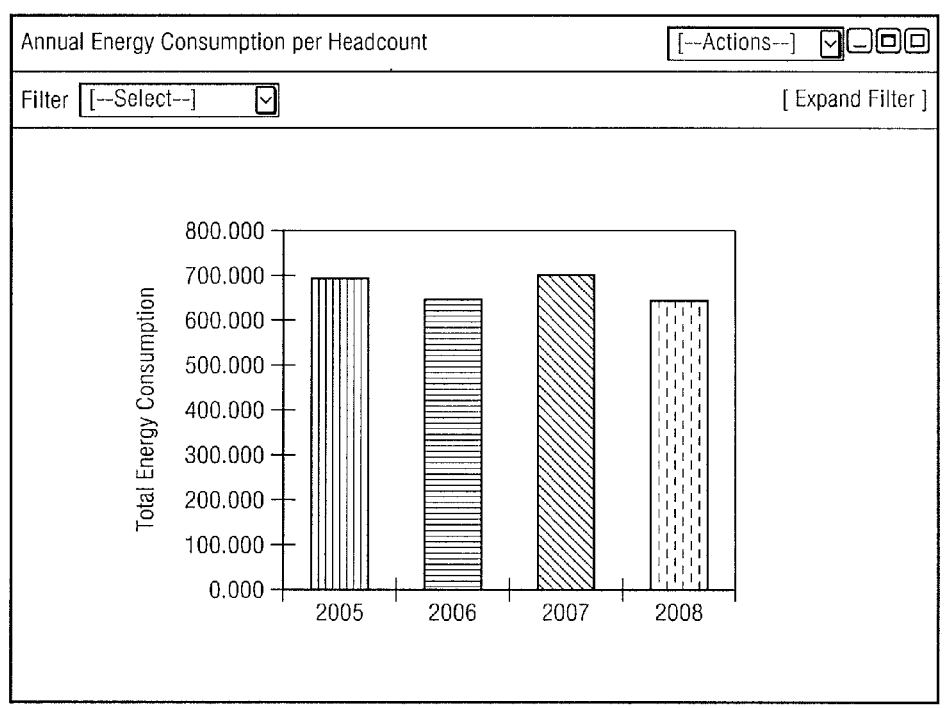

In particular embodiments, GUI dashboards 152 may enable a user to aggregate data at variety of different hierarchical levels. According to one embodiment, data may be aggregated according to the geographical OBS. Additionally, data may be further aggregated according to a variety of logical hierarchies. For example, FIG. 6 is an example GUI dashboard 152 illustrating total energy consumption aggregated by year. FIG. 7 is an example embodiment of GUI dashboard 152 illustrating energy consumption per headcount and aggregated by year.

In various embodiments, manager application 150 may provide a user with the option to input metric data, which may contribute to the generation of key performance indicators (KPIs). In particular embodiments, KPIs may be used to measure the progress of one or more projects in terms of achieving identified objectives. In some embodiments, for example, KPIs for environmental sustainability may include energy consumption, actual return, cost savings, reduction of particular GHG emissions, and/or any other indicator that may be used to measure the progress of one or more projects in terms of achieving identified objectives. In addition, project performance may be measured in terms of project management features, such as, for example, schedules, milestones, tasks, and resource consumption. In various embodiments, KPIs may be used to measure the progress of all or a portion of an organization in a manner that may not necessarily be defined or bounded in terms of projects. For example, some KPIs may indicate one or more of the following: the carbon footprint of the organization as a whole; energy consumption of particular facilities; shipping in terms of nautical miles attributed to particular organizational divisions or products; and/or any other performance indicator(s) for all or a portion of an organization.

FIG. 8 is one example embodiment of GUI dashboard 152 showing various KPIs for multiple objectives organized into rows according to a two-level hierarchy. Although this example includes a two-level hierarchy, any other hierarchy may be used without departing from the scope of the present disclosure. In this example, the KPI columns include a trend column populated with arrow icons for each objective. The direction of the arrow indicates a positive, neutral, or negative trend relative to sustainability objectives. Each KPI cell may be drilled into (e.g., via a mouse-click selection) to see how the data associated with the underlying metric is progressing. For example, selecting one of the arrow icons of the trend column may reveal a trend line charting the available data values over time.

In particular embodiments, step 218 may include generating reports related to stakeholder impact on sustainability. The term "stakeholder" as used herein generally refers to any customer, supplier, internal or external partner, employee, manager, nongovernmental organization (NGO), etc. that may impact, and/or be impacted by, environmental sustainability decisions and/or activities of an organization. In various embodiments, a stakeholder software object may enable organizations to maintain stakeholder related data and integrate such data into key business sustainability practices.

In various embodiments, stakeholder objects maintained by system 100 may have instances defining one or more of the following characteristics of the stakeholder: description; category (e.g., customer, competitor, NGO, etc.); owner of the relationship; nature of the relationship; funds provided by the stakeholder; approval power granted to the stakeholder; importance rating from an organizational perspective; objectives that may affect the stakeholder relationship; projects that the stakeholder may have suggested to the company (whether formally or informally); past, present, or future projects that may impact the stakeholder interest; how stakeholder interest may be affected by past, present, or future projects (i.e. positively or negatively); assessment activities involving the stakeholder; etc. FIG. 9 illustrates an example embodiment of dashboard 152 that may be used to display stakeholder data.

The stakeholder object may further enable a user or manager application 150 to score the extent to which stakeholder interests align with organizational interests and/or the extent to which such interests may be optimally aligned. In some cases, this information may indicate the volatility of particular stakeholder relationships. For example, if a stakeholder is rated as important and the delta between actual and optimal interest alignment is high, then manager application 150 may suggest taking action to improve the relationship. Manager application 150 may be capable of generating reports that indicate organization activities that have a significant impact on stakeholder interests. Thus, step 218 may include generating a variety of reports logically linked to particular stakeholders, which may be used, for example, to help shape the perception of sustainability efforts and objectives.

In various embodiments, stakeholder objects may be linked to one or more projects. In this manner, stakeholder interests may be a factor considered during the portfolio identification of step 210. Additionally, during the course of a project, various progress reports and/or dashboards may be generated in step 218 and automatically communicated to stakeholders. The relevant stakeholder identities for each project may be readily determined using the linked stakeholder objects. In addition, as shown in FIG. 9, the nature of various relationships between stakeholders and projects may be defined. For example, the stakeholder "Building Technologies, Inc." is shown as having or expected to have a very strong influence over the "building insulation" project. As another example, the stakeholder "Employees" are impacted only minimally by the "several consolidation" project.

Thus, customizable reports may be generated in step 218 using a variety of different software objects that may be logically linked together. In various embodiments, the reports may provide feedback that informs subsequent decision-making process as flowchart 200 loops back to step 202 or some other step in the process.

In step 220, assessments may be defined and executed. Each assessment may have any number of attributes. For example, particular assessments may have one or more attributes selected from the following: date range; human rights; health and safety; labor management relations; diversity of workforce; water usage; applicable facilities; operational boundaries; organizational boundaries; geographical boundaries; product safety; supply chain; number of employees; carbon emissions; energy efficiency; waste; recycling; environmental safety; transportation; travel; and reporting.

Particular assessments may enable users to step back and objectively determine how an organization is performing in a variety of different areas. Some assessments may be initiated in response to the detection of a problem related to one or more defined objectives. The format, design and purpose of an assessment can vary widely and may be highly customizable. FIG. 10 illustrates one example embodiment of GUI dashboard 152 illustrating various assessments performed by manager application 150.

In particular embodiments, manager application 150 may provide templates that can be used as a guide for creating and executing successful assessments. For example, a collection of common assessment attributes may be made available to users to jumpstart the assessment creation and provide some fundamental traits from which to choose. These object attributes can be concealed or added to the assessment view to meet the specific requirements. Alternatively, manager application 150 may enable users to generate customized assessments from scratch.

Although the type and context of the assessment can vary, the framework of linked objects provided by various embodiments generally enables a variety of features. For example, particular assessments may include the ability to: generate assessment related activity records for monitoring progress of data collection; align the assessment with a project to manage associated costs, resources and progress; provide a record (e.g., an audit trail) of organizational efforts surrounding the assessment type (e.g., past and present); spawn and track ideas created as part of the assessment findings; use ideas spawned by assessments to generate projects; provide dashboard-type reporting of assessment progress (e.g., GUI dashboard 152 of FIG. 10); preserve assessment results for auditing, which may be used to serve as a foundation for future assessment iterations; attach key assessment documents, such as surveys and attestations; integrate with web-based data collection forms; collect data using online questionnaires, surveys, etc., whether provided internally within system 100 or externally by third party online survey providers, and/or some other ability related to assessing performance of an organization.

Once an assessment is defined, the assessment may later be recalled to help instantiate a new assessment. Particular user-defined assessment types can be instantiated as many times as needed as part of a process of ongoing monitoring and improvement. Each assessment may inherit the innate capabilities of the parent assessment.

The components of the systems and apparatuses disclosed herein may be integrated or separated. Moreover, the operations of the systems and apparatuses may be performed by more, fewer, or other components. The methods may include more, fewer, or other steps. Additionally, steps may be performed in any suitable order. For example, although FIG. 2 illustrates step 220 as an individual step within flowchart 200, in particular embodiments the assessments described in step 220 may be used to help identify risks in step 204, to identify sources in step 212, to measure performance in step 216, to notify individuals or sub-systems to track sources for particular locations, and/or to enable a variety of other features. In particular embodiments, all or a portion of the steps disclosed herein may be wholly automated, partially automated, and/or partially performed manually. Particular operations of the systems and apparatuses disclosed herein may be performed using any suitable logic embodied in non-transitory computer-readable media. As used in this document, "each" refers to each member of a set or each member of a subset of a set.

Although the present disclosure has been described above in connection with several embodiments, a myriad of changes, substitutions, variations, alterations, transformations, and modifications may be suggested to one skilled in the art, and it is intended that the present invention encompass such changes, substitutions, variations, alterations, transformations, and modifications as fall within the spirit and scope of the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A computer-implemented method for aligning projects with an objective of an organization, the method comprising:
   prompting at least one user to input an objective comprising a measurable performance expectation related to environmental sustainability of an organization and one or more parameters describing the organization;

automatically outputting suggested compliance requirements based upon a predefined relationship between the one or more parameters and one or more environmental regulations;

storing in a data storage device an object representing the objective of the organization;

storing in the data storage device a plurality of environmental sustainability projects of the organization;

as data relating to a plurality of activities performed by the organization is received, establishing, by a computer processor, a computer-based logical link between the object representing the objective of the organization and one or more activity objects representing one or more of the plurality of activities performed as relating to at least some of the plurality of environmental sustainability projects of the organization;

receiving data representing one or more respective metrics for each of the at least some of the plurality of environmental sustainability projects of the organization; and generating, by the computer processor, one or more key performance indicators for each of the at least some of the plurality of environmental sustainability projects of the organization, each key performance indicator indicating a contribution of a particular environmental sustainability project of the organization towards achieving the objective of the organization with respect to the suggested compliance requirements; and transferring, by the computer processor, a dashboard report comprising a representation of the one or more key performance indicators, the dashboard report generated based on the logical linking of the objective representing the objective of the organization and the one or more activity objects representing the one or more activities performed, the dashboard report transferred in a format selected from one or more of a computer-displayable format and a tangible format.

2. The method of claim 1, wherein the dashboard report comprises a table comprising each of the one or more key performance indicators for each of the at least some of the plurality of environmental sustainability projects of the organization, at least some of the key performance indicators indicating, as a graphical icon that is non-numeric, the contribution of the particular environmental sustainability project.

3. The method of claim 1, wherein the objective of the organization comprises reducing carbon emissions.

4. The method of claim 1, wherein the objective of the organization comprises one or more objectives selected from the group consisting of:
increasing energy use efficiency;
reducing CO2e to at least a predefined target;
reducing energy consumption;
reducing consumption of natural resources;
enhancing reputation;
cutting costs; and
increasing revenue.

5. The method of claim 1, wherein a subdivision of the organization generates at least a portion of the received data for at least one but not all of the plurality of environmental sustainability projects.

6. The method of claim 1, wherein the received data representing one or more respective metrics for each of the plurality of environmental sustainability projects of the organization comprises an identification of one or more sources selected from the group consisting of:
a facility of the organization;
a subdivision of the organization;
a geographic region;
an electrical energy meter;
a gas emission meter;
a water meter; and
a waste meter.

7. The method of claim 1, further comprising aggregating the one or more respective metrics for each of the plurality of environmental sustainability projects of the organization.

8. A non-transitory computer-readable medium comprising software operable, when executed by at least one processor, to:

prompt at least one user to input an objective comprising a measurable performance expectation related to environmental sustainability of an organization and one or more parameters describing the organization;

automatically output suggested compliance requirements based upon a predefined relationship between the one or more parameters and one or more environmental regulations;

store in a computer system an object representing the objective of the organization;

store in the computer system a plurality of sustainability projects of the organization;

as data relating to a plurality of activities performed by the organization is received, establish a computer-based logical link between the object representing the objective of the organization and one or more activity objects representing one or more of the plurality of activities performed as relating to at least some of the plurality of sustainability projects of the organization;

receive from the computer system data representing one or more respective metrics for each of the at least some of the plurality of sustainability projects of the organization;

generate one or more key performance indicators for each of the at least some of the plurality of sustainability projects of the organization, each key performance indicator indicating a contribution of a particular sustainability project of the organization towards achieving the objective of the organization; with respect to the suggested compliance requirements and transfer a dashboard report comprising a representation of the one or more key performance indicators, the dashboard report generated based on the logical linking of the objective representing the objective of the organization and the one or more activity objects representing the one or more activities performed, the dashboard report transferred in a format selected from one or more of a computer-displayable format and a tangible format.

9. The computer-readable medium of claim 8, wherein the dashboard report comprises a table comprising each of the one or more key performance indicators for each of the at least some of the plurality of environmental sustainability projects of the organization, at least some of the key performance indicators indicating, as a graphical icon that is non-numeric, the contribution of the particular environmental sustainability project.

10. The computer-readable medium of claim 8, wherein the objective of the organization comprises reducing carbon emissions.

11. The computer-readable medium of claim 8, wherein the objective of the organization comprises one or more objectives selected from the group consisting of:
increasing energy use efficiency;
reducing CO2e to at least a predefined target;
reducing energy consumption;
reducing consumption of natural resources;

enhancing reputation;
cutting costs; and
increasing revenue.

12. The computer-readable medium of claim 8, wherein a subdivision of the organization generates at least a portion of the received data for at least one but not all of the plurality of sustainability projects.

13. The computer-readable medium of claim 8, wherein the received data representing one or more respective metrics for each of the at least some of the plurality of sustainability projects of the organization comprises an identification of one or more data sources selected from the group consisting of:
   a facility of the organization;
   a subdivision of the organization;
   a geographic region;
   an electrical energy meter;
   a gas emission meter;
   a water meter;
   a waste meter; and
   user input.

14. The computer-readable medium of claim 8, wherein the software is further operable, when executed by the at least one processor, to aggregate the data representing the one or more respective metrics for each of the at least some of the plurality of sustainability projects of the organization.

15. A data processing system for aligning projects with an objective of an organization, the data processing system comprising:
   at least one processor; and
   one or more memory modules collectively storing:
   an object representing an objective of the organization;
   a respective representation of each of a plurality of sustainability projects of the organization; and
   logic operable, when executed by the at least one processor, to:
      prompt at least one user to input the objective of the organization, the objective comprising a measurable performance expectation related to environmental sustainability of the organization and one or more parameters describing the organization;
      automatically output suggested compliance requirements based upon a predefined relationship between the one or more parameters and one or more environmental regulations;
      as data relating to a plurality of activities performed by the organization is received, establish a computer-based logical link between the object representing the objective of the organization and one or more activity objects representing one or more of the plurality of activities performed as relating to at least some of the plurality of sustainability projects of the organization;
      receive data representing one or more respective metrics for each of the at least some of the plurality of sustainability projects of the organization;
      generate one or more key performance indicators for each of the at least some of the plurality of sustainability projects of the organization, each key performance indicator indicating a contribution of a particular sustainability project of the organization towards achieving the objective of the organization with respect to the suggested compliance requirements; and
      transfer a dashboard report comprising a representation of the one or more key performance indicators, the dashboard report generated based on the logical linking of the objective representing the objective of the organization and the one or more activity objects representing the one or more activities performed, the dashboard report transferred in a format selected from one or more of a computer-displayable format and a tangible format.

16. The data processing system of claim 15, wherein the dashboard report comprises a table comprising each of the one or more key performance indicators for each of the at least some of the plurality of environmental sustainability projects of the organization, at least some of the key performance indicators indicating, as a graphical icon that is non-numeric, the contribution of the particular environmental sustainability project.

17. The data processing system of claim 15, wherein the objective of the organization comprises reducing carbon emissions.

18. The data processing system of claim 15, wherein the objective of the organization comprises one or more objectives selected from the group consisting of:
   increasing energy use efficiency;
   reducing CO2e to at least a predefined target;
   reducing energy consumption;
   reducing consumption of natural resources;
   enhancing reputation;
   cutting costs; and
   increasing revenue.

19. The data processing system of claim 15, wherein a subdivision of the organization generates at least a portion of the received data for at least one but not all of the plurality of sustainability projects.

20. The data processing system of claim 15, wherein the data representing one or more respective metrics for each of the at least some of the plurality of sustainability projects of the organization comprises an identification of one or more sources selected from the group consisting of:
   a facility of the organization;
   a subdivision of the organization;
   a geographic region;
   an electrical energy meter;
   a gas emission meter;
   a water meter; and
   a waste meter.

21. The data processing system of claim 15, wherein the logic is further operable, when executed by the at least one processor, to aggregate the data representing the one or more respective metrics for each of the at least some of the plurality of sustainability projects of the organization.

* * * * *